United States Patent
Xi et al.

(10) Patent No.: US 9,625,768 B2
(45) Date of Patent: Apr. 18, 2017

(54) PIXEL STRUCTURE, DISPLAY PANEL AND DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventors: Kerui Xi, Shanghai (CN); Jianxin Li, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/728,910

(22) Filed: Jun. 2, 2015

(65) Prior Publication Data
US 2016/0187735 A1  Jun. 30, 2016

(30) Foreign Application Priority Data
Dec. 24, 2014  (CN) .......................... 201410835866

(51) Int. Cl.
*G02F 1/1343* (2006.01)

(52) U.S. Cl.
CPC .. *G02F 1/134309* (2013.01); *G02F 1/134336* (2013.01); *G02F 2001/134318* (2013.01); *G02F 2001/134372* (2013.01)

(58) Field of Classification Search
CPC ............... G02F 1/134336; G02F 2001/134372
See application file for complete search history.

(56) References Cited

U.S. PATENT DOCUMENTS

| 2007/0279567 A1 | 12/2007 | Matsushima | |
|---|---|---|---|
| 2012/0112200 A1 | 5/2012 | Nagano | |
| 2015/0177579 A1* | 6/2015 | Lim | G02F 1/134336 345/90 |
| 2015/0205172 A1* | 7/2015 | Shin | G02F 1/134363 349/143 |

FOREIGN PATENT DOCUMENTS

| CN | 101750805 A | 6/2010 |
|---|---|---|
| CN | 102998859 A | 3/2013 |
| CN | 103838041 A | 6/2014 |
| JP | H1090708 A | 4/1998 |
| KR | 20070003190 A | 1/2007 |
| KR | 20100066025 A | 6/2010 |

* cited by examiner

*Primary Examiner* — Phu Vu
(74) *Attorney, Agent, or Firm* — Faegre Baker Daniels LLP

(57) ABSTRACT

The present disclosure discloses a pixel structure, a display panel and a display device, wherein the pixel structure includes a first electrode and a second electrode located above the first electrode, at least one of the first electrode and the end electrode is provided with a concave structure in the region at the intersection between the first electrode and the end electrode, so as to increase the distance between the first electrode and the end electrode at the intersection, resulting in that the undesired electric field formed between the end electrode and the first electrode is weakened, namely, the electric field unbeneficial for the pixels to display the white state is weakened, so that the light transmittance of pixels during displaying the white state in an FFS display mode is improved, so as to optimize the display effects of the display panel and the display device.

20 Claims, 15 Drawing Sheets

US 9,625,768 B2

PIXEL STRUCTURE, DISPLAY PANEL AND DISPLAY DEVICE

CROSS-REFERENCE TO RELATED APPLICATION

This application claims priority to Chinese Application No. 201410835866.4, filed Dec. 24, 2014, which is herein incorporated by reference in its entirety.

TECHNICAL FIELD

The present disclosure relates to medical devices and methods for accessing an anatomical space of the body. More specifically, the disclosure relates to devices and methods for accessing the pericardial space of the heart in a minimally-invasive manner.

BACKGROUND

With the development of display technology, liquid crystal display panels have been utilized more and more widely, and a display effect of the liquid crystal display panels is improved continuously. There are many types of existing liquid crystal display panels, among which a Fringe Field Switching (FFS) display panel is very common. The FFS display panel has advantages such as large size, large visual angle, high response speed, accurate color rendering and light weight.

As shown in FIG. 1, a pixel structure of the FFS display panel in the related art includes: a common electrode 11 and a pixel electrode 12 located below the common electrode 11, where the common electrode 11 is provided with slits 111, branch electrodes 112 disposed parallel to the slits 111 and end electrodes 113 connected with ends of the branch electrodes. In the case the FFS display panel is powered on, a voltage is applied across the common electrode 11 and the pixel electrode 12 to form an electric field between the common electrode 11 and the pixel electrode 12, such that the liquid crystal molecules in the FFS display panel are driven to rotate and a white state is displayed.

As shown in FIG. 1, the common electrode 11 includes the branch electrodes 112 and the end electrodes 113, thus the electric field formed between the common electrode 11 and the pixel electrode 12 is constructed by electric fields respectively formed between the branch electrodes 112 and the pixel electrodes 12 and between the end electrodes 113 and the pixel electrodes 12. The electric field formed between the branch electrode 112 and the pixel electrode 12 has a direction X1, and can change the initial state of the liquid crystal molecules (which is the state of the liquid crystal molecules when the display panel is not powered on) and thus rotate the liquid crystal molecules, so that the white state is displayed by the pixels when light passes through the rotated liquid crystal molecules. However, since the end electrode 113 is parallel to an edge of the pixel electrode 12 at a side thereof close to the end electrode 113, and the electric field formed between the end electrode 113 and the pixel electrode 12 further includes an electric field having a direction X2 (which is shown as a horizontal direction), the electric field having the direction X2 tends to maintain the initial state of the liquid crystal molecules and hence is unbeneficial for the rotating of the liquid crystal molecules, and a light polarization phenomenon occurs, thereby reducing the light transmittance of the pixels presenting the white state and accordingly degrading the display effect of the display panel.

SUMMARY

In view of this, embodiments of the disclosure provide a pixel structure, a display panel and a display device to solve the technical problem, described above, that the light transmittance of pixels in a white state is reduced by the electric field formed between the end electrode of a common electrode and a pixel electrode.

In a first example, embodiments of the disclosure provide a pixel structure, including:
  a first electrode and a second electrode located above the first electrode, where the second electrode includes at least one slit, branch electrodes disposed parallel to the slit and an end electrode connected with an end of the branch electrodes;
  where at least one of the end electrode and the first electrode is provided with a concave structure in a region or area at an intersection between the end electrode and the first electrode, so as to increase a distance between the end electrode and the first electrode.

In a second example, embodiments of the disclosure provide a display panel, which includes the pixel structure in the above-mentioned first example.

In a third example, embodiments of the disclosure provide a display device, which includes the display panel in the above-mentioned second example.

With the pixel structure, the display panel and the display device according to embodiments of the disclosure, at least one of the first electrode and the end electrode is provided with the concave structure in the region or area at the intersection between the first electrode and the end electrode of the second electrode in the pixel structure, so as to increase the distance between the first electrode and the end electrode at the intersection in a substantially horizontal direction, resulting in that the undesired electric field formed between the end electrode and the first electrode is weakened, namely, the electric field unbeneficial for the pixels to display the white state is weakened, thereby improving the light transmittance of the pixels during the white state in the FFS display mode, such that the display effects of the display panel and the display device is optimized.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

With the detailed non-limiting embodiments described below with reference to accompanying drawings, other features, purposes and advantages of the disclosure will become more apparent.

Figure 1:
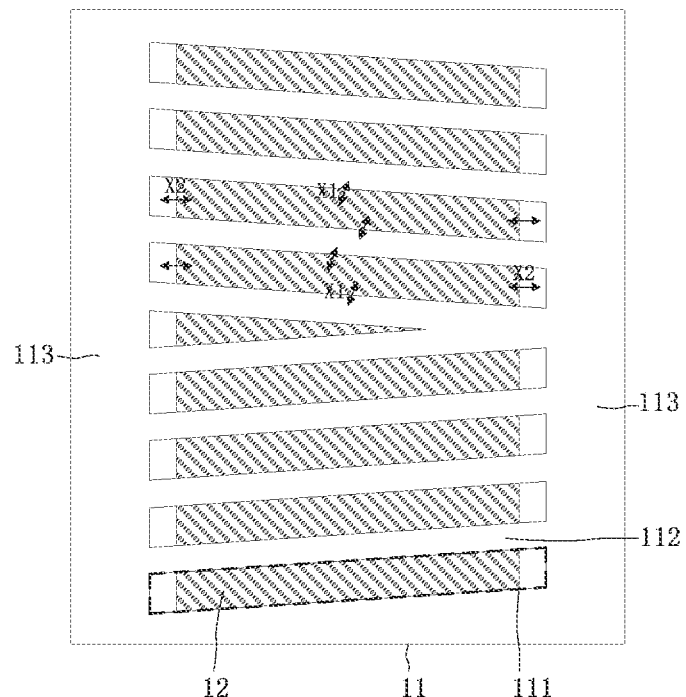
FIG. 1 is a schematic diagram showing a structure of a pixel structure in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be described below further in detail with reference to the accompanying drawings and the embodiments. It is appreciated that the embodiments described herein are used to explain the disclosure, rather than limit the disclosure. It is further noted that, to facilitate the description, a part and not the whole of content in the disclosure is shown in the accompanying drawings.

Figure 2A:
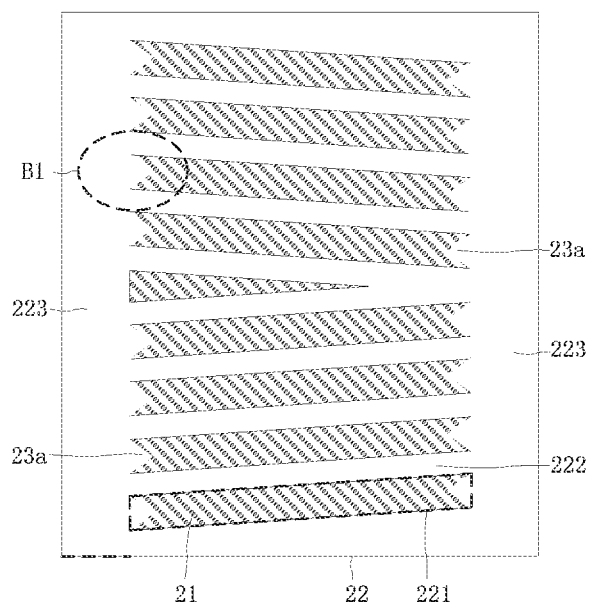
FIG. 2A is a schematic diagram showing a structure of a pixel structure according to embodiments of the disclosure.

Embodiments of the disclosure provide a pixel structure. FIG. 2A is a schematic diagram showing a structure of a pixel structure according to embodiments of the disclosure. As shown in FIG. 2A, the pixel structure includes: a first electrode 21 and a second electrode 22 located above the first electrode 21, where the second electrode 22 includes at least one slit 221, branch electrodes 222 disposed parallel to the slit 221, and an end electrode 223 connected with an end of each of the branch electrodes; further, at least one of the end electrode 223 and the first electrode 21 is provided with a concave area in a region or area at an intersection between the end electrode 223 and the first electrode 21, so as to increase the distance between the end electrode 223 and the first electrode 21.

In the case that a voltage is applied to the first electrode 21 and the second electrode 22, an electric field is formed between the first electrode 21 and the second electrode 22, namely, an electric field is formed between the branch electrode 222 and the first electrode 21 and another electric field is formed between the end electrode 223 and the first electrode 21, where the electric field formed between the branch electrode 222 and the first electrode 21 facilitates displaying the white state by the pixels, while the electric field formed between the end electrode 222 and the first electrode 21 is disadvantageous for displaying the white state by the pixels. Since at least one of the end electrode 223 and the first electrode 21 is provided with a concave structure 23a in the region or area at the intersection between the end electrode 223 and the first electrode 21 so as to increase the distance between the end electrode 223 and the first electrode 21, the undesired electric field formed between the end electrode 223 and the first electrode 21, namely, the electric field unbeneficial for displaying the white state by the pixels, is weakened, therefore the light transmittance of the pixels during displaying the white state may be improved by the above-mentioned technical solution according to embodiments of the disclosure.

As shown in FIG. 2A, the first electrode 21 is a pixel electrode, and the second electrode 22 is a common electrode. FIG. 2A shows a first electrode 21 and a second electrode 22 corresponding to one pixel in the pixel structure. However, in a pixel structure including a plurality of the pixels, a plurality of second electrodes 22 corresponding to the plurality of pixels may be connected to form a planar electrode, and a plurality of the first electrodes 21 respectively corresponding to the plurality of pixels are present, where first electrodes 21 are arranged independently of each other and each have a bar shape.

Figure 2B:
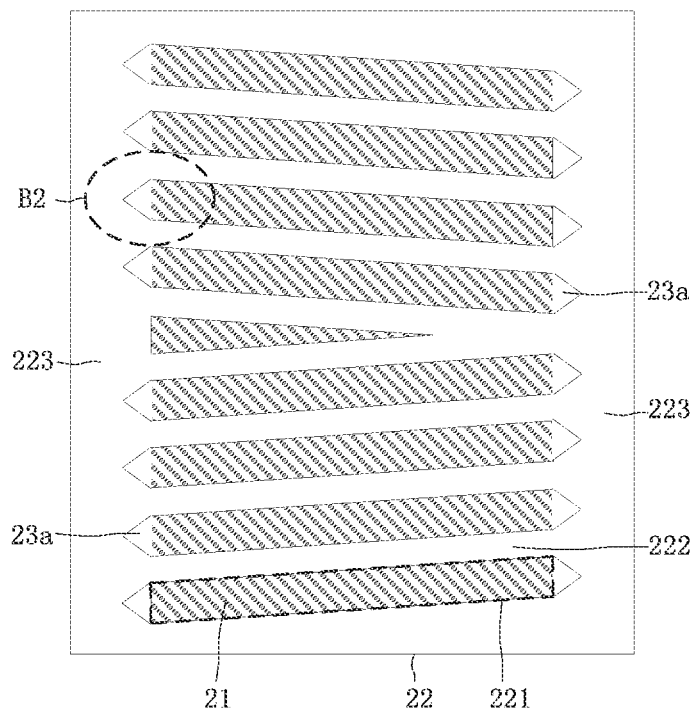
FIG. 2B is a schematic diagram showing a structure of another pixel structure according to embodiments of the disclosure.
Figure 2C:
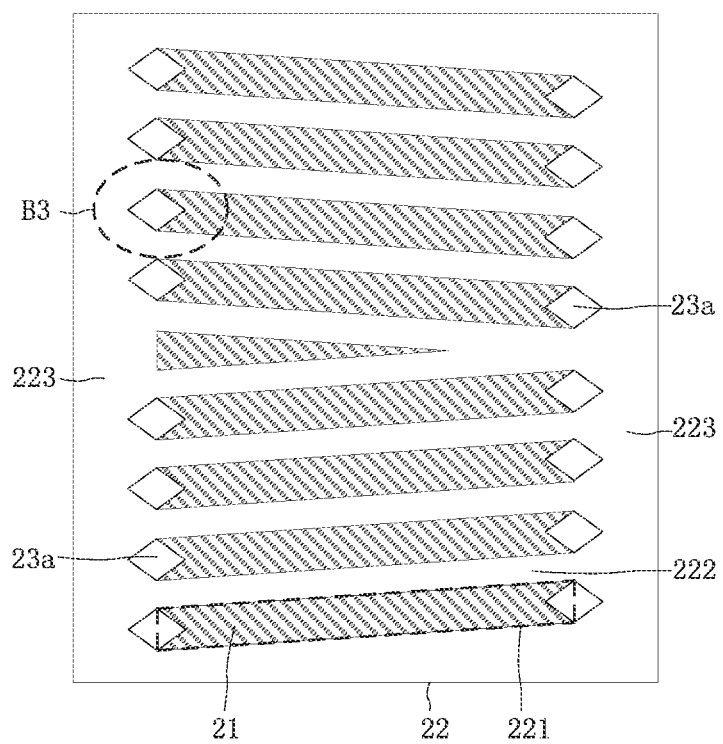
FIG. 2C is a schematic diagram showing a structure of yet another pixel structure according to embodiments of the disclosure.

As shown in FIG. 2A, only the first electrode 21 is provided with the concave structure 23a in the region or area at the intersection between the end electrode 223 and the first electrode 21; alternatively, as shown in FIG. 2B, only the end electrode 223 is provided with the concave structure 23a in the region or area at the intersection between the end electrode 223 and the first electrode 21; or as shown in FIG. 2C, both of the end electrode 223 and the first electrode 21 are provided with the concave structures 23a in the region or area at the intersection between the end electrode 223 and the first electrode 21. As shown in FIG. 2A to FIG. 2C, given that the concave structures 23a have the same shapes and same sizes, the distance between the end electrode 223 and the first electrode 21 may be even more increased by the concave structures 23a disposed in both of the end electrode 223 and the first electrode 21 than the case where the concave structure 23a is disposed in only one of either the first electrode 21 or the end electrode 223, so as to more weaken the undesired electric field formed between the end electrode 223 and the first electrode 21, thereby improving the light transmittance of the pixels during displaying the white state in an FFS display mode.

Figure 3A:
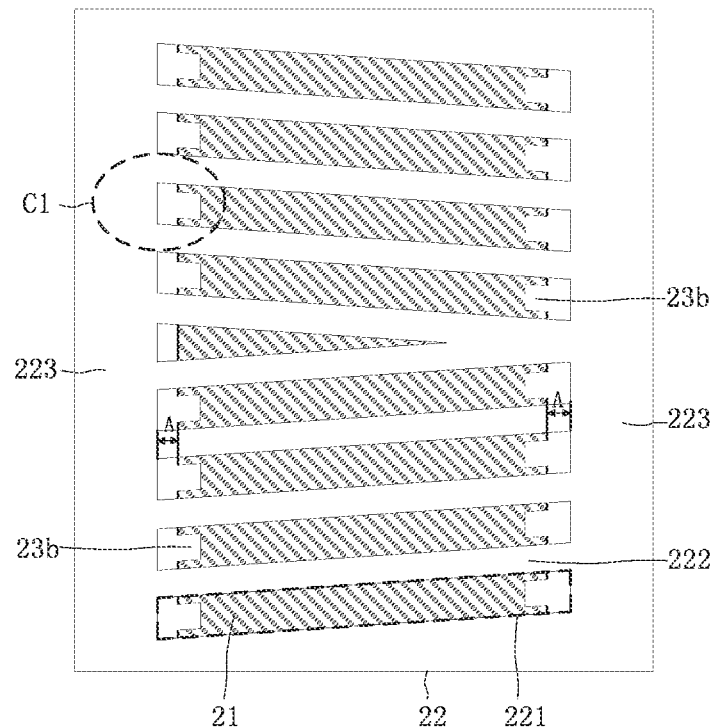
FIG. 3A is a schematic diagram showing a structure of yet another pixel structure according to embodiments of the disclosure.

As shown in FIG. 2A to FIG. 2C, the edge of the end electrode 223 at the side thereof close to the branch electrode 222 is adjacent or overlapped with the edge of the first electrode 21 at the intersection between the branch electrode 222 and the end electrode 223 connected with the branch electrode 222. Alternatively, as shown in FIG. 3A, the edge of the end electrode 223 at the side thereof close to the branch electrode 222 is spaced from the edge of the first electrode 21 by a first preset distance A at the intersection between the branch electrode 222 and the end electrode 223 connected with the branch electrode 222, and thus the end electrode 223 is not overlapped with the first electrode 21. As shown in FIG. 3A, the distance between the end electrode 223 and the first electrode 21 is even more increased by the first preset distance A between the edge of the end electrode 223 at the side thereof close to the branch electrode 222 and the edge of the first electrode 21 at the intersection between the branch electrode 222 and the end electrode 223 than the case that the edge of the end electrode 223 at the side thereof close to the branch electrode 222 is adjacent or overlapped with the edge of the first electrode 21 at the intersection between the branch electrode 222 and the end electrode 223, so as to more weaken the undesired electric field formed between the end electrode 223 and the first electrode 21, thereby improving the light transmittance of the pixels during displaying the white state in the FFS display mode.

Figure 3B:
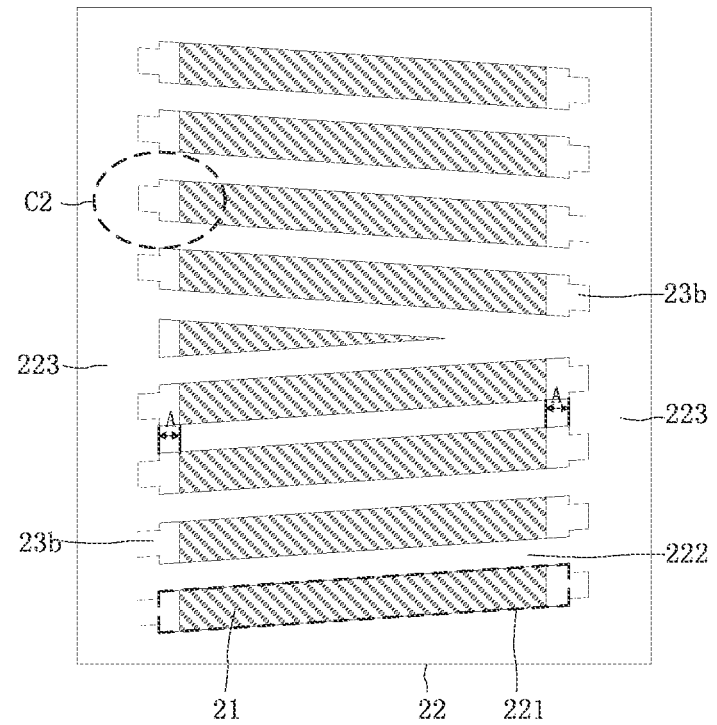
FIG. 3B is a schematic diagram showing a structure of yet another pixel structure according to embodiments of the disclosure.
Figure 3C:
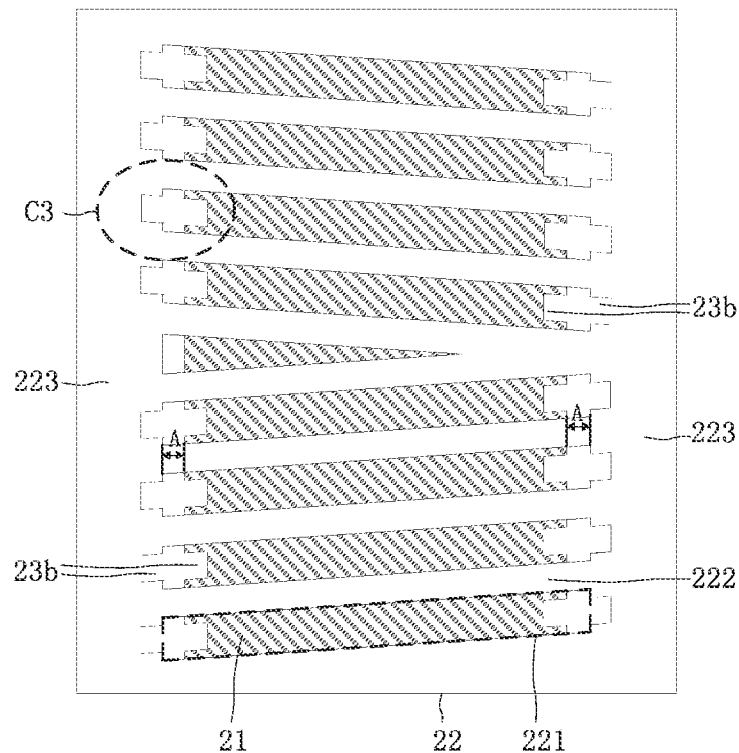
FIG. 3C is a schematic diagram showing a structure of yet another pixel structure according to embodiments of the disclosure.

As shown in FIG. 3A, the first electrode 21 is provided with a concave structure 23b in a region or area at the intersection between the end electrode 223 and the first electrode 21. Alternatively, as shown in FIG. 3B, the end electrode 223 is provided with the concave structure 23b in the region or area at the intersection between the end electrode 223 and the first electrode 21; or as shown in FIG. 3C, both of the end electrode 223 and the first electrode 21 are provided with the concave structures 23b in the region or area at the intersection between the end electrode 223 and the first electrode 21. As shown in FIG. 3A to FIG. 3C, given that the concave structures 23b have the same shapes and the same sizes, the increase of the distance between the end electrode 223 and the first electrode 21 caused by the concave structures 23b disposed in both of the end electrode 223 and the first electrode 21 is more than that caused by the concave structure 23b disposed at only the first electrode 21 or at only the end electrode 223, so as to more weaken the undesired electric field formed between the end electrode 223 and the first electrode 21, thereby improving the light transmittance of the pixels during displaying the white state in an FFS display mode.

Figure 3D:
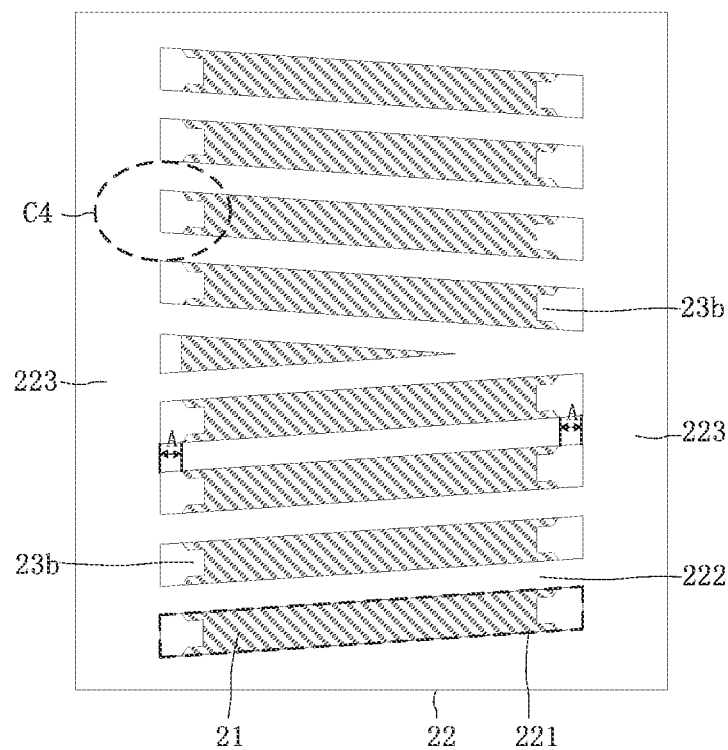
FIG. 3D is a schematic diagram showing a structure of yet another pixel structure according to embodiments of the disclosure.

In an example as shown in FIG. 3D based on FIG. 3A, the first electrode 21 is provided with the concave structure 23b, and an edge of the concave structure 23b is intersected with an edge of the branch electrode 222 adjacent to the concave structure 23b and close to one side of the concave structure 23b. As compared with the pixel structure shown in FIG. 3A, the pixel structure in FIG. 3D provide a more enlarged concave structure 23b of the first electrode 21 at the intersection between the first electrode 21 and the end electrode 223, so as to further weaken the undesired electric field formed between the first electrode 21 and the end electrode 223, thereby improving the light transmittance of the pixels during displaying the white state in the FFS display mode.

In some embodiments of the disclosure, the first preset distance A is larger than 0 µm and is less than or equal to 3 µm as shown in FIG. 3A to FIG. 3D. It can be obtained from the design principle of the pixel structure that, if the first preset distance A is large, the aperture ratio of the pixels is influenced. Thus, given an allowable aperture ratio, the first preset distance A may be properly set within the above-mentioned range of the first preset distance A, such that the distance between the end electrode 223 and the first electrode 21 may be properly increased, so as to properly weaken the undesired electric field formed between the end electrode 223 and the first electrode 21, thereby improving the light transmittance of the pixels during displaying the white state in the FFS display mode.

Figure 4A:
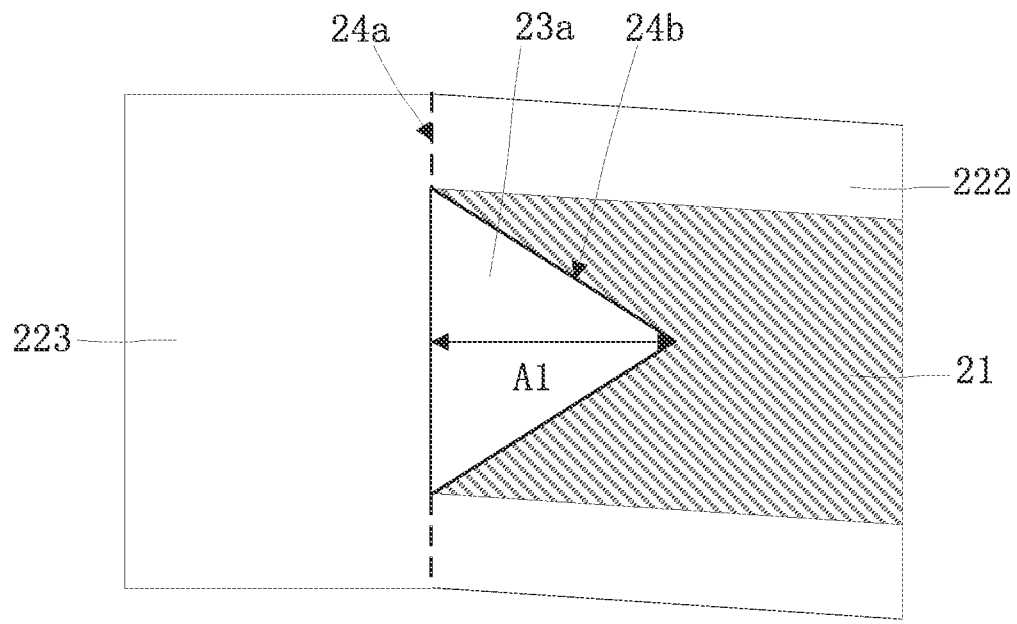
FIG. 4A is a schematic enlarged view showing an area B1 in FIG. 2A.
Figure 5A:
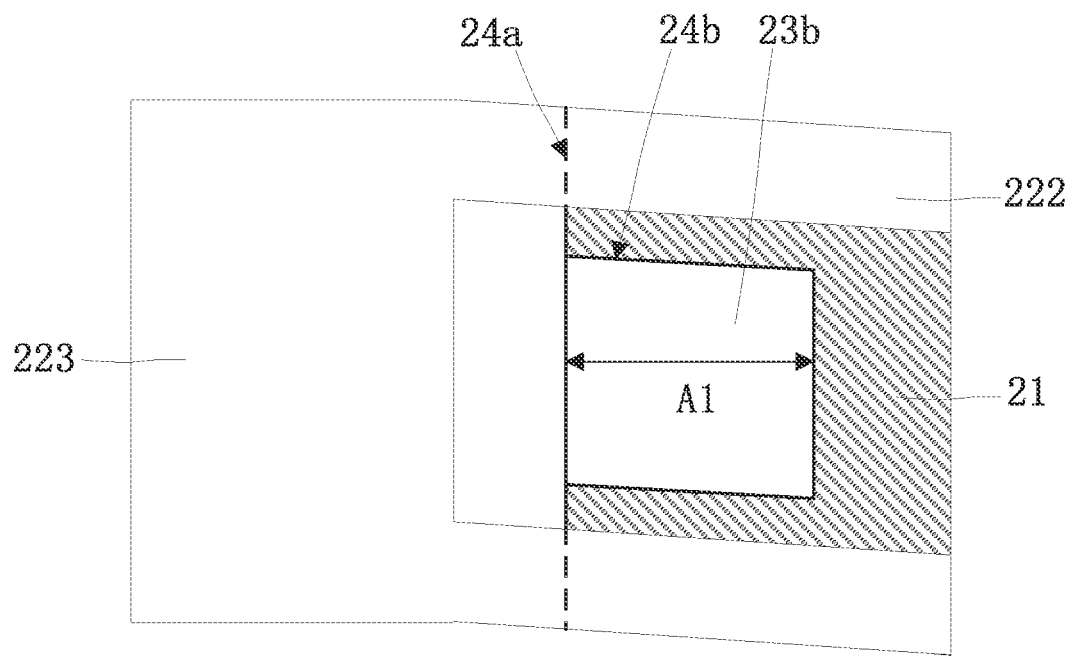
FIG. 5A is a schematic enlarged view showing an area C1 in FIG. 3A.
Figure 5B:
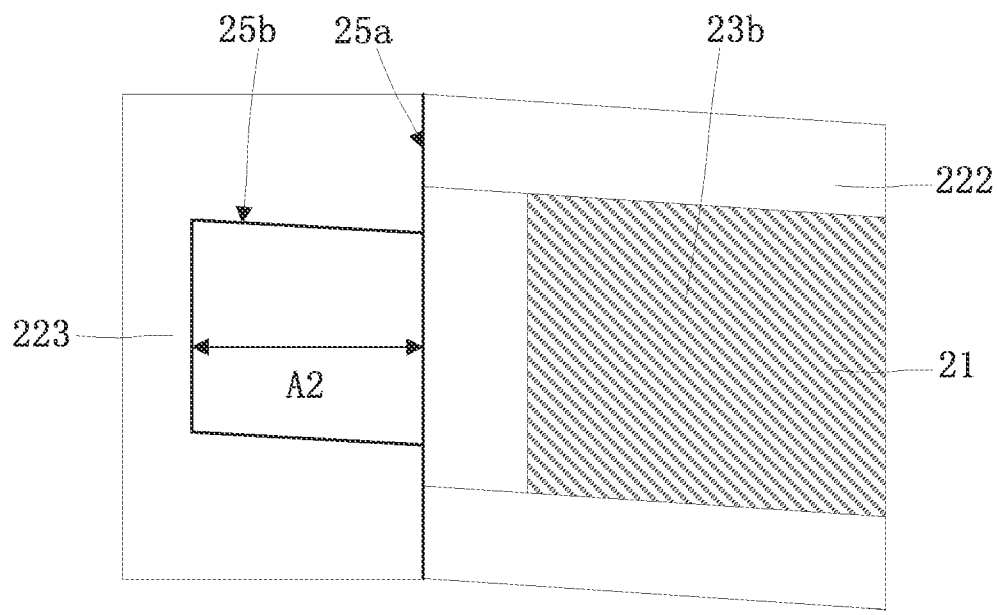
FIG. 5B is a schematic enlarged view showing an area C2 in FIG. 3B.
Figure 5C:
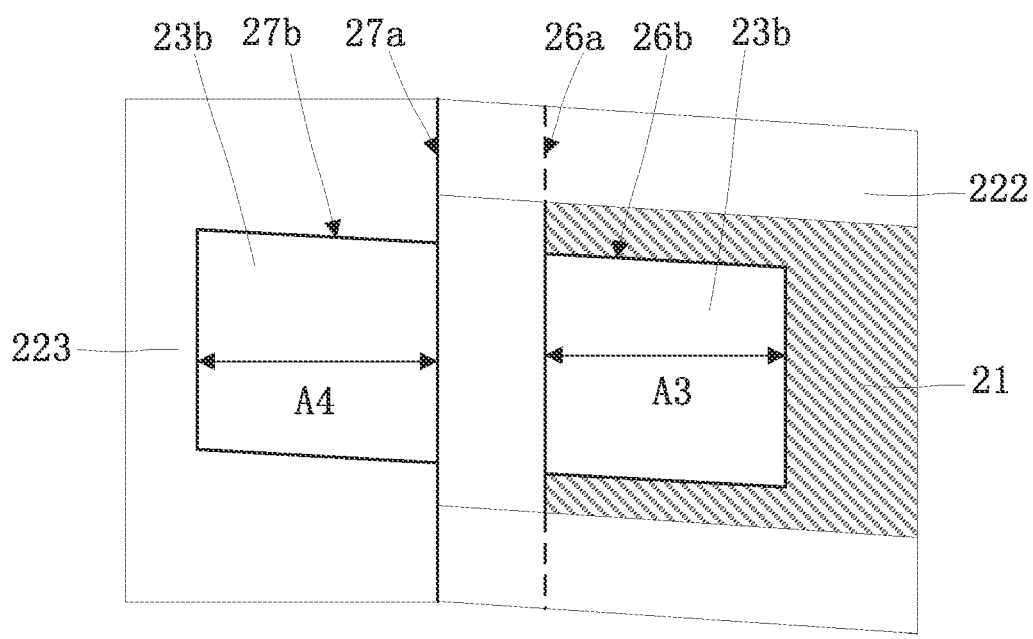
FIG. 5C is a schematic enlarged view showing an area C3 in FIG. 3C.
Figure 5D:
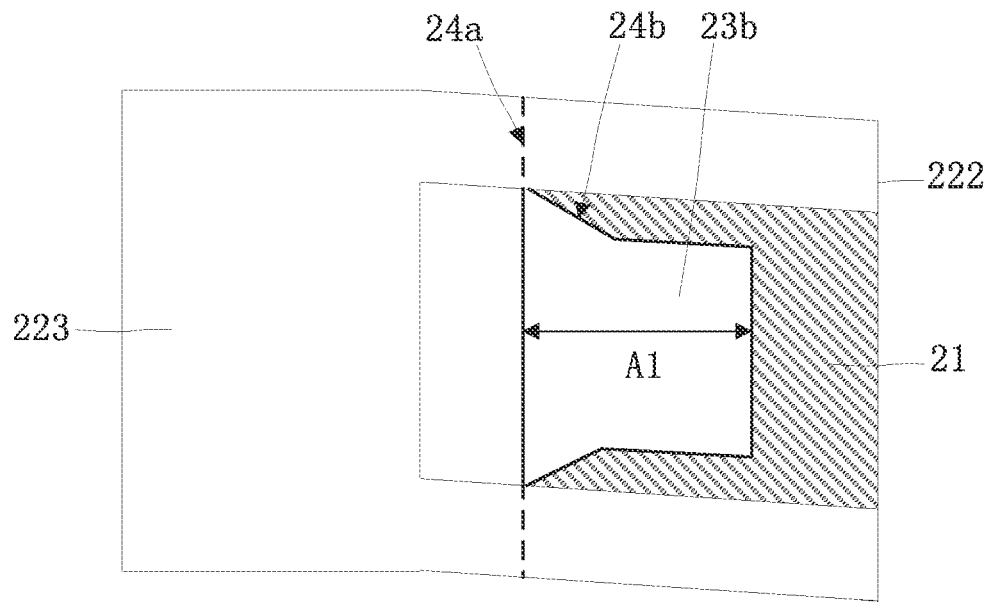
FIG. 5D is a schematic enlarged view showing an area C4 in FIG. 3D.

In some embodiments of the disclosure, as shown in FIG. 4A (which corresponds to a schematic enlarged view of an area B1 in FIG. 2A), FIG. 5A (which corresponds to a schematic enlarged view of an area C1 in FIG. 3A) and FIG. 5D (which corresponds to a schematic enlarged view of an area C4 in FIG. 3D), in the case that only the first electrode 21 is provided with the concave structure (such as the concave structure 23a in FIG. 4A and the concave structure 23b in FIG. 5A and FIG. 5D), an edge of the first electrode 21 at one side thereof where the concave structure is disposed includes a first straight edge 24a and a first concave edge 24b, and the maximum distance A1 from the first concave edge 24b to a straight line where the first straight edge 24a is located is larger than 0 µm and is less than or equal to 6 µm. It is noted that, the above-mentioned maximum distance A1 from the first concave edge 24 to the straight line where the first straight edge 24a is located is referred to as the maximum depth of the concave structure of the first electrode 21.

Figure 4B:
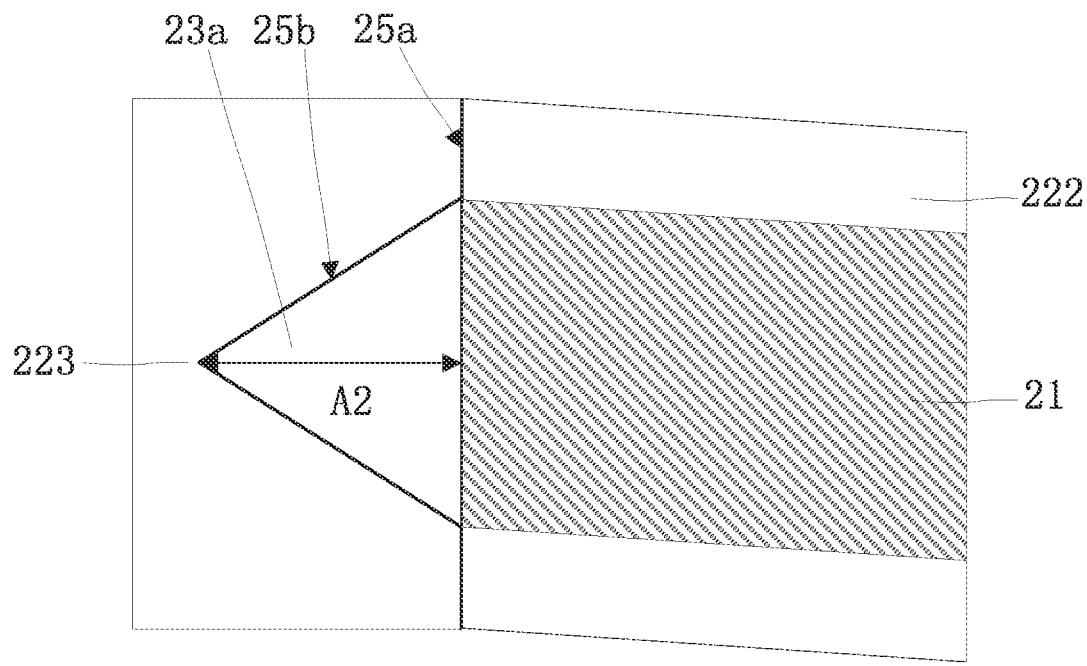
FIG. 4B is a schematic enlarged view showing an area B2 in FIG. 2B.

In some embodiments of the disclosure, as shown in FIG. 4B (which corresponds to a schematic enlarged view of an area B2 in FIG. 2B) and FIG. 5B (which corresponds to a schematic enlarged view of an area C2 in FIG. 3B), in the case that only the end electrode 223 is provided with the concave structure (such as the concave structure 23a in FIG. 4B and the concave structure 23b in FIG. 5B), an edge of the end electrode 223 at one side thereof where the concave structure is disposed includes a second straight edge 25a and a second concave edge 25b, and the maximum distance A2 from the second concave edge 25b to a straight line where the second straight edge 25a is located is larger than 0 µm and is less than or equal to 6 µm. It is noted that, the above-mentioned maximum distance A2 from the second concave edge 25b to the straight line where the second straight edge 25a is located is referred to as the maximum depth of the concave structure of the end electrode 223.

Figure 4C:
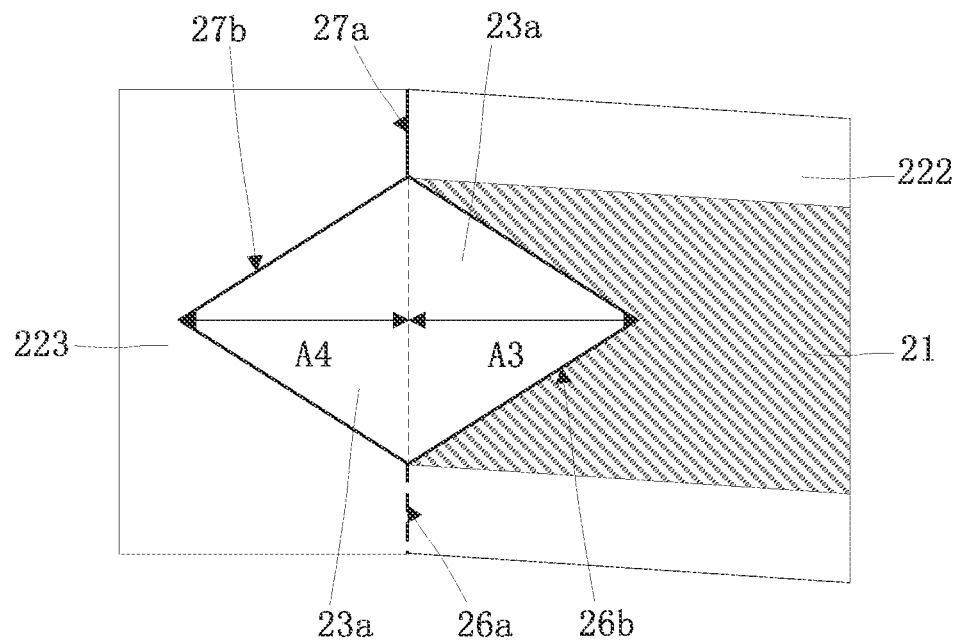
FIG. 4C is a schematic enlarged view showing an area B3 in FIG. 2C.

In some embodiments of the disclosure, as shown in FIG. 4C (which corresponds to a schematic enlarged view of an area B3 in FIG. 2C) and FIG. 5C (which corresponds to a schematic enlarged view of an area C3 in FIG. 3C), in the case that both of the end electrode 223 and the first electrode 21 are provided with the concave structures (such as the concave structures 23a in FIG. 4C and the concave structures 23b in FIG. 5C), the edge of the first electrode 21 at one side thereof where the concave structure is disposed includes a third straight edge 26a and a third concave edge 26b, and the edge of the end electrode 223 at one side thereof where the concave structure is disposed includes a fourth straight edge 27a and a fourth concave edge 27b, where the maximum distance A3 from the third concave edge 26b to a straight line where the third straight edge 26a is located and the maximum distance A4 from the fourth concave edge 27b to a straight line where the fourth straight edge 27a is located are larger than 0 µm and are less than or equal to 6 µm. It is noted that, in the case that both of the end electrode 223 and the first electrode 21 are provided with the concave structures, the maximum distance A3 from the third concave edge 26b to the straight line where the third straight edge 26a is located is referred to as the maximum depth of the concave structure of the first electrode 21, and the maximum distance A4 from the fourth concave edge 27b to the straight line where the fourth straight edge 27a is located is referred to as the maximum depth of the concave structure of the end electrode 223.

It is noted that, all of the above-mentioned maximum distances may be selected and set according to the specific design and requirements, as long as the electric field formed between the first electrode and the end electrode at the intersection between the first electrode and the end electrode is weakened, thereby improving the light transmittance of the pixels during displaying the white state.

Figure 6A:
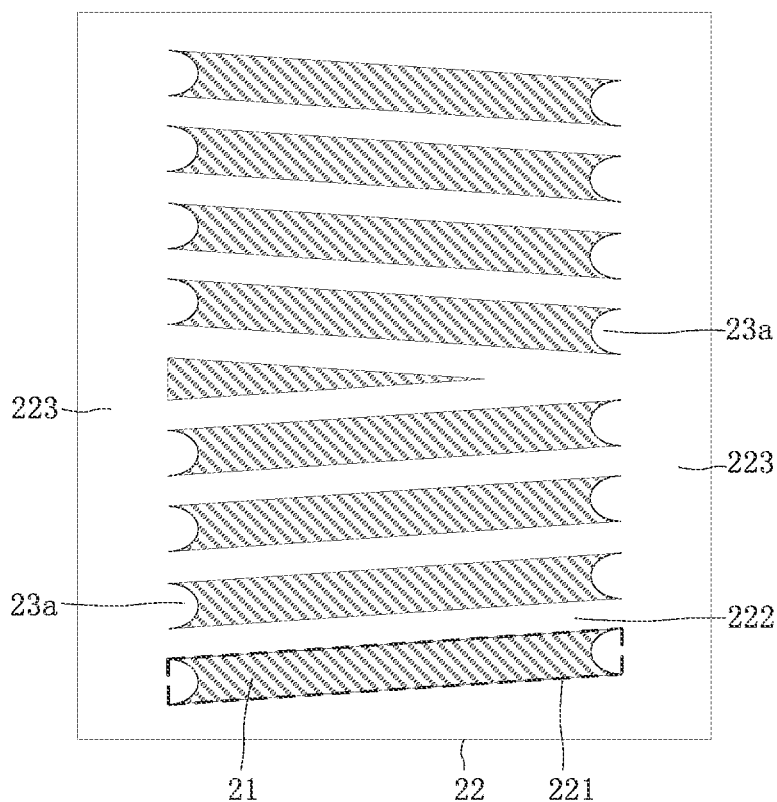
FIG. 6A is a schematic diagram showing a structure of yet another pixel structure according to embodiments of the disclosure.
Figure 6B:
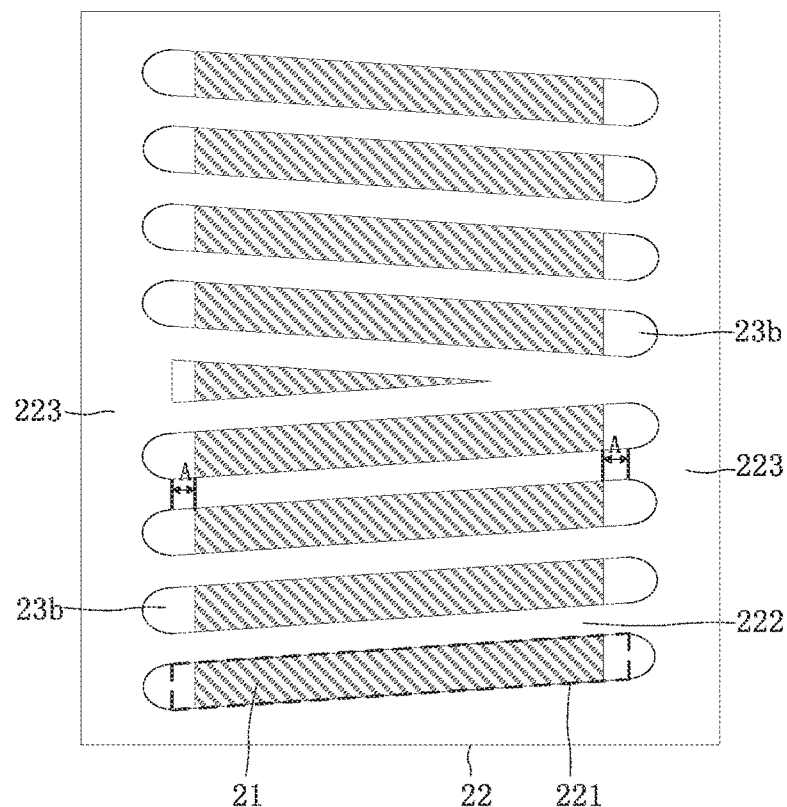
FIG. 6B is a schematic diagram showing a structure of yet another pixel structure according to embodiments of the disclosure.
Figure 6C:
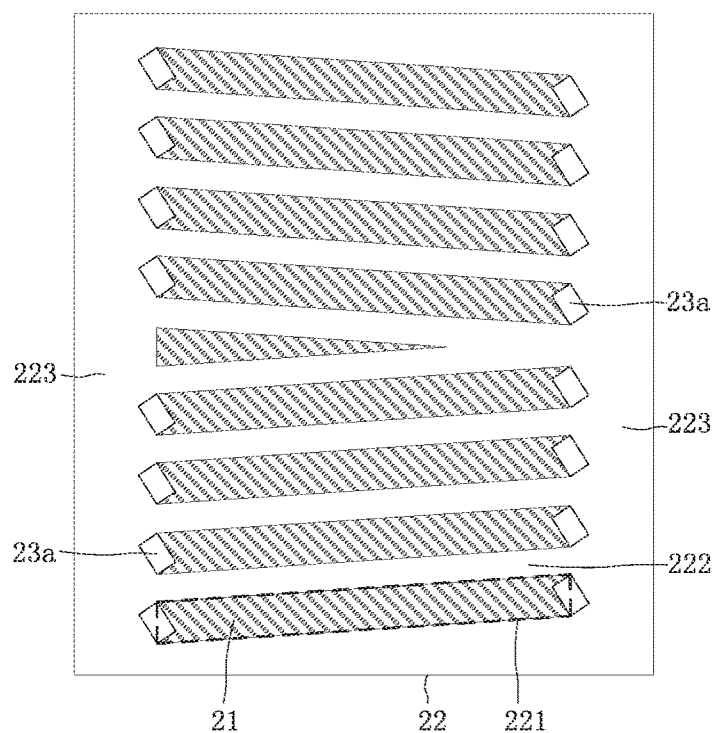
FIG. 6C is a schematic diagram showing a structure of yet another pixel structure according to embodiments of the disclosure.
Figure 6D:
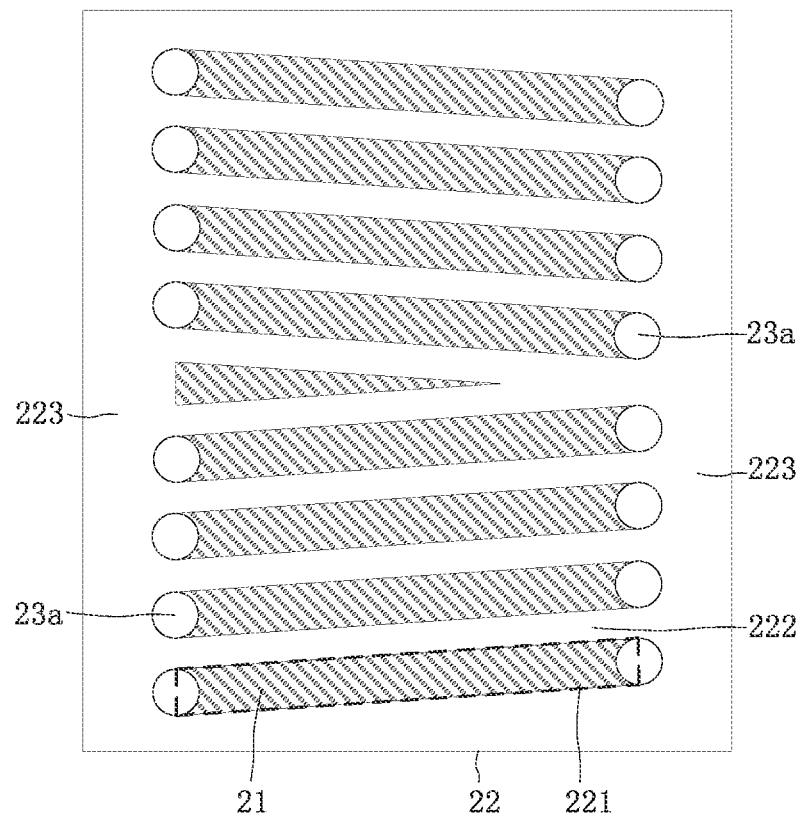
FIG. 6D is a schematic diagram showing a structure of yet another pixel structure according to embodiments of the disclosure.
Figure 6E:
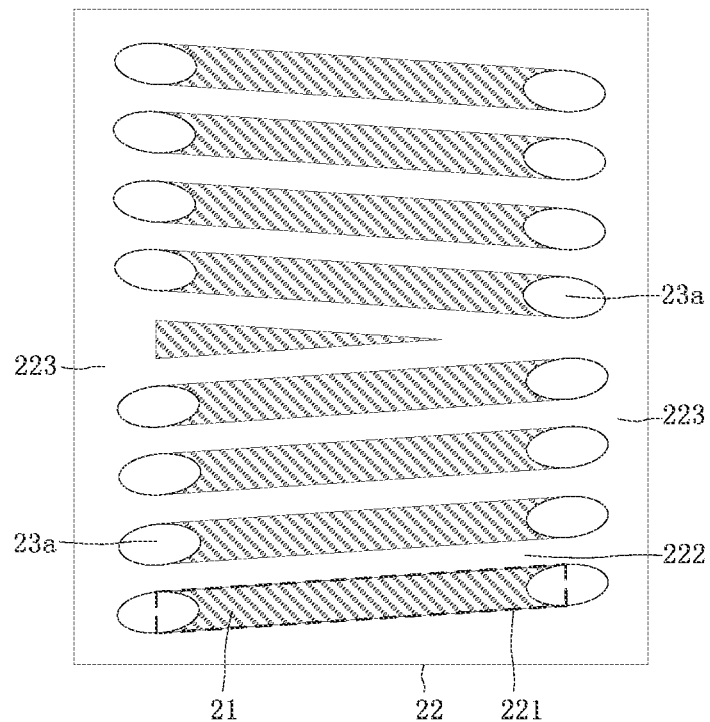
FIG. 6E is a schematic diagram showing a structure of yet another pixel structure according to embodiments of the disclosure.

As shown in FIG. 2A to FIG. 2C and in FIG. 3A to FIG. 3D, the concave structures have polygonal shapes. In addition, the concave structures can have an arcuate or arc shape. For example, the concave structure 23a of the first electrode 21 at the intersection between the end electrode 223 and the first electrode 21 has an arc shape as shown in FIG. 6A, which is different from the shape of the concave structure 23a as shown in FIG. 3A; or the concave structure 23b of the end electrode 223 has an arc shape at the intersection between the end electrode 223 and the first electrode 21 as shown in FIG. 6B, which is different from the shape of the concave structure 23a as shown in FIG. 3B; or both the concave structures 23a of the first electrode 21 and the end electrode 223 have polygonal shapes in the region or area at the intersection between the end electrode 223 and the first electrode 21 as shown in FIG. 6C, but a rhombus is formed by the concave edges of the concave structures 23a of the first electrode 21 and the end electrode 223 as shown in FIG. 2C, while a rectangle is formed by the concave edges of the concave structures 23a of the first electrode 21 and the end electrode 223 as shown in FIG. 6C; or both the concave structures 23a of the first electrode 21 and the end electrode 223 have an arc shape at the intersection between the end electrode 223 and the first electrode 21 as shown in FIG. 6D, and a circle is formed by the arc edges of the two concave structures 23a; or both the concave structures 23a of the first electrode 21 and the end electrode 223 have an arc shape at the intersection between the end electrode 223 and the first electrode 21 as shown in FIG. 6E, and an oval is formed by the arc edges of the two concave structures 23a. Of course, the concave structure may also be of other shapes, which are not limited herein. The edge of the first electrode 21 and the edge of the end electrode 223 are no longer parallel to each other due to the shape of the concave structure(s) in that the first electrode 21 or the end electrode 223 or both of the first electrode 21 and the end electrode 223 are provided with the concave structures in the region or area at the intersection between the end electrode 223 and the first electrode 21, which results in the diversity of the directions of the electric fields between the first electrode 21 and the end electrode 223, so as to weaken the electric field unbeneficial for the pixels displaying the white state, thereby improving the light transmittance of the pixels during displaying the white state in the FFS display mode.

In the above-mentioned embodiments, the first electrode is the pixel electrode and the second electrode is the common electrode, namely, the common electrode is located above the pixel electrode in the pixel structure, which is a common type of pixel structure in the FFS display mode. In the following embodiments, the first electrode is the common electrode and the second electrode is the pixel electrode, namely, the pixel electrode is located above and the common electrode in the pixel structure. The terms "above" and "below" refer to relative positions of the pixel electrode and the common electrode.

Figure 7A:
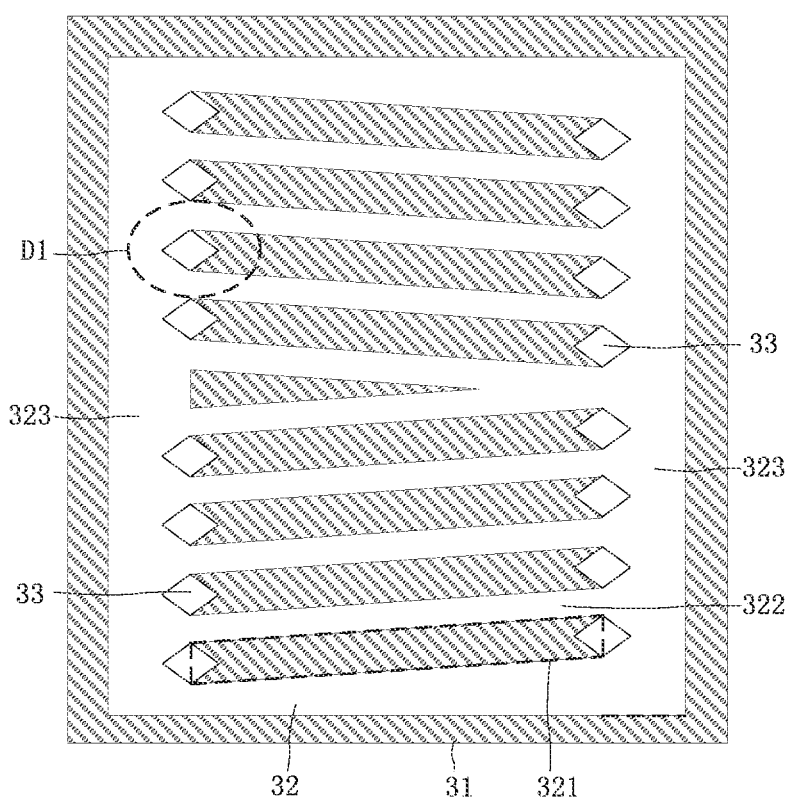
FIG. 7A is a schematic diagram showing a structure of yet another pixel structure according to embodiments of the disclosure.

As shown in FIG. 7A, a pixel structure includes: a first electrode 31 and a second electrode 32 located above the first electrode 31, where the second electrode 32 includes at least one slit 321, branch electrodes 322 disposed parallel to the slit 321, and an end electrode 323 connected with an end of each of the branch electrodes; further, each of the first electrode 31 and the end electrode 323 is provided with a concave structure 33 in the region or area at the intersection between the end electrode 323 and the first electrode 31, so as to increase the distance between the end electrode 323 and the first electrode 31.

As shown in FIG. 7A, the first electrode 31 is a common electrode, and the second electrode 32 is a pixel electrode. A first electrode 31 and a second electrode 32 corresponding to one pixel in the pixel structure are shown in FIG. 7A. However, in a pixel structure including a plurality of the pixels, a plurality of first electrodes 31 corresponding to the plurality of pixels are connected to form a planar electrode, and a plurality of second electrodes 32 respectively corresponding to the plurality of pixels are present, where second electrodes 32 are arranged independently of each other, and each have a bar shape.

Figure 7B:
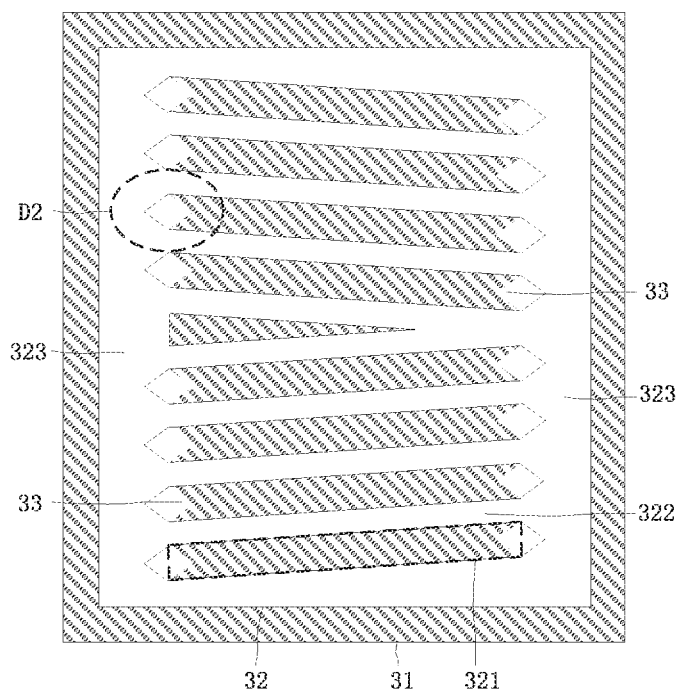
FIG. 7B is a schematic diagram showing a structure of yet another pixel structure according to embodiments of the disclosure.

As shown in FIG. 7A, each of the end electrode 323 and the first electrode 31 is provided with the concave structure 33 in the region or area at the intersection between the end electrode 323 and the first electrode 31. Alternatively, as shown in FIG. 7B, only the first electrode 31 is provided with the concave structure 33. As shown in FIG. 7A and FIG. 7B, in the case that the concave structures 33 have the same shapes and the same sizes, the increase of the distance between the end electrode 323 and the first electrode 31 caused by the concave structures 23 disposed in both of the end electrode 323 and the first electrode 31 is more than that caused by the concave structures 33 disposed at only the first electrode 31, so as to more weaken the undesired electric field formed between the end electrode 323 and the first electrode 31, thereby improving the light transmittance of the pixels during displaying the white state in the FFS display mode.

Figure 8A:
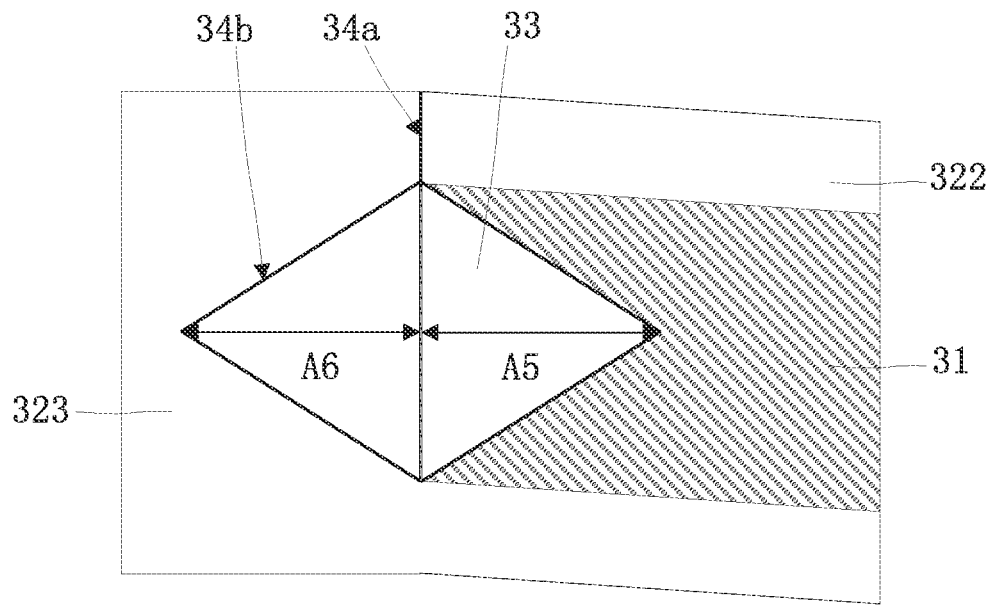
FIG. 8A is a schematic enlarged view showing an area D1 in FIG. 7A.
Figure 8B:
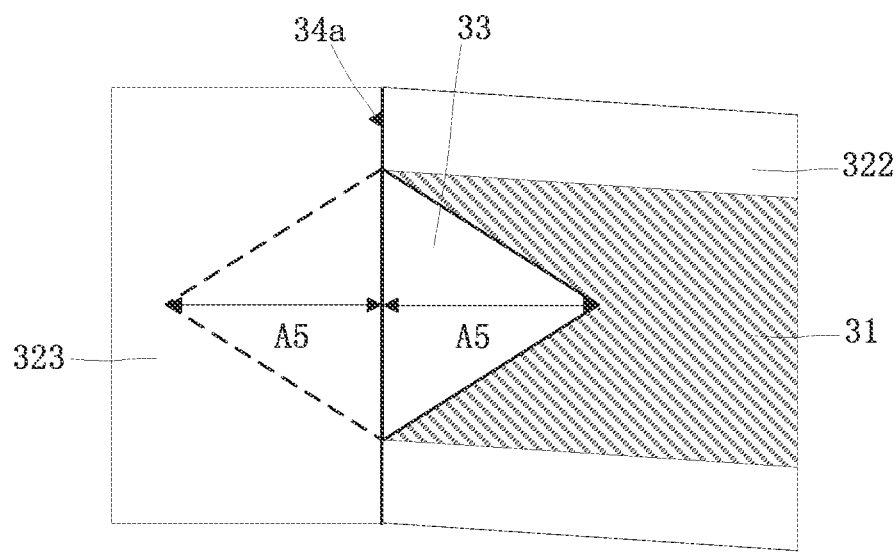
FIG. 8B is a schematic enlarged view showing an area D2 in FIG. 7B.

In some embodiments of the disclosure, as shown in FIG. 8A (which corresponds to a schematic enlarged view of an area D1 in FIG. 7A) where both of the end electrode 323 and the first electrode 31 are provided with the concave structures 33, or as shown in FIG. 8B (which corresponds to a schematic enlarged view of an area D2 in FIG. 7B) where only the first electrode 31 is provided with the concave structure 33, an edge of the end electrode 323 at the side thereof close to the concave structure 33 of the first electrode 31 at least includes a fifth straight edge 34a, and the maximum distance A5 from the concave edge of the concave structure 33 of the first electrode 31 to the straight line where the fifth straight edge 34a is located is larger than 0 μm and is less than or equal to 6 μm. It is noted that, in the case that both of the end electrode 323 and the first electrode 31 are provided with the concave structures 33 or only the first electrode 31 is provided with the concave structure 33, the maximum distance A5 from the concave edge of the concave structure 33 at one side of the fifth straight edge 34a to the straight line where the fifth straight edge 34a is located is referred to as the maximum depth of the concave structure.

In some embodiments of the disclosure, as shown in FIG. 8A, in the case that both of the end electrode 323 and the first electrode 31 are provided with the concave structures 33, an edge of the end electrode 323 further includes a fifth concave edge 34b, and the maximum distance A6 from the fifth concave edge 34b to the straight line where the fifth straight edge 34a is located is larger than 0 μm and is less than or equal to 6 μm. It is noted that, the maximum distance A6 from the fifth concave edge 34b to the straight line where the fifth straight edge 34a is located is referred to as the maximum depth of the concave structure 33 of the end electrode 323.

It is noted that, all of the above-mentioned maximum distances can be selected and set according to the specific design and requirements, as long as the electric field formed between the first electrode and the end electrode at the intersection between the first electrode and the end electrode is weakened, thereby improving the light transmittance of the pixels during displaying the white state in the FFS display mode.

As shown in FIG. 7A and FIG. 7B, the shape of the concave structure 33 of the first electrode 31 is a rhombus. In addition, the shape of the concave structure 33 of the first electrode 31 may also be a rectangle, a circle, an oval or the like. For example, as shown in FIG. 9A, the shape of the concave structure 33 of the first electrode 31 is a rectangle; or as shown in FIG. 9B, the shape of the concave structure 33 of the first electrode 31 is a circle; or as shown in FIG. 9C, the shape of the concave structure 33 of the first electrode 31 is an oval.

Figure 9A:
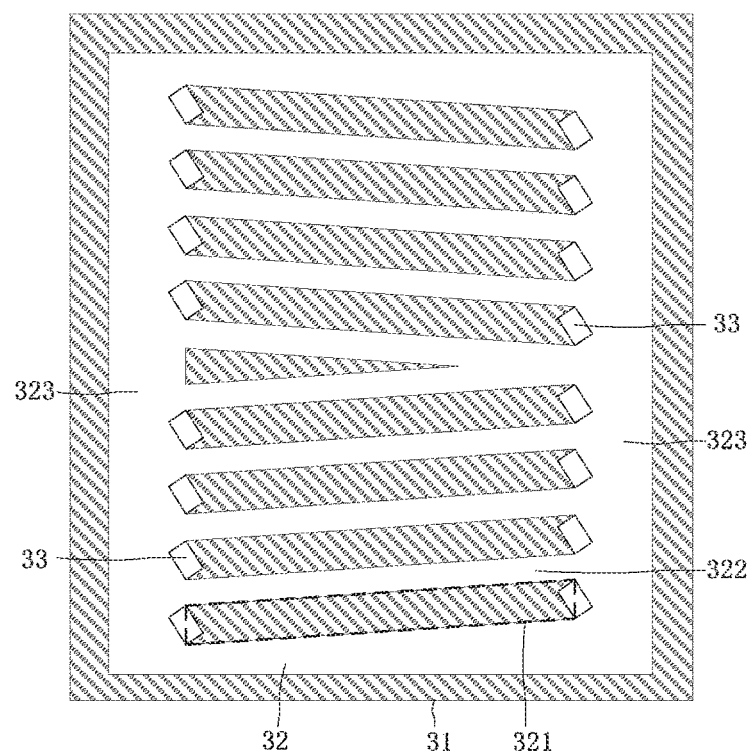
FIG. 9A is a schematic diagram showing a structure of yet another pixel structure according to embodiments of the disclosure.
Figure 9B:
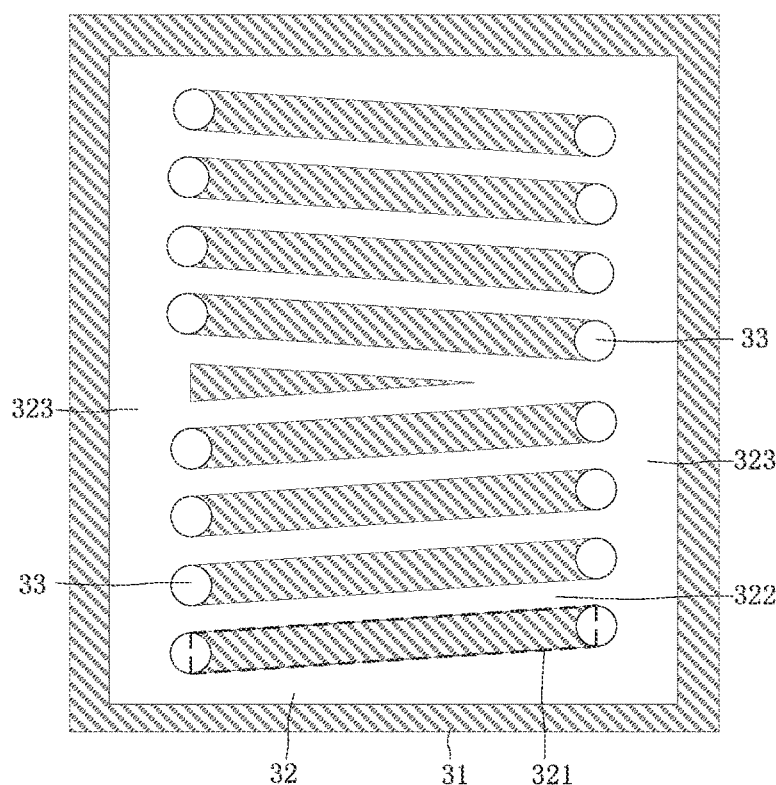
FIG. 9B is a schematic diagram showing a structure of yet another pixel structure according to embodiments of the disclosure.
Figure 9C:
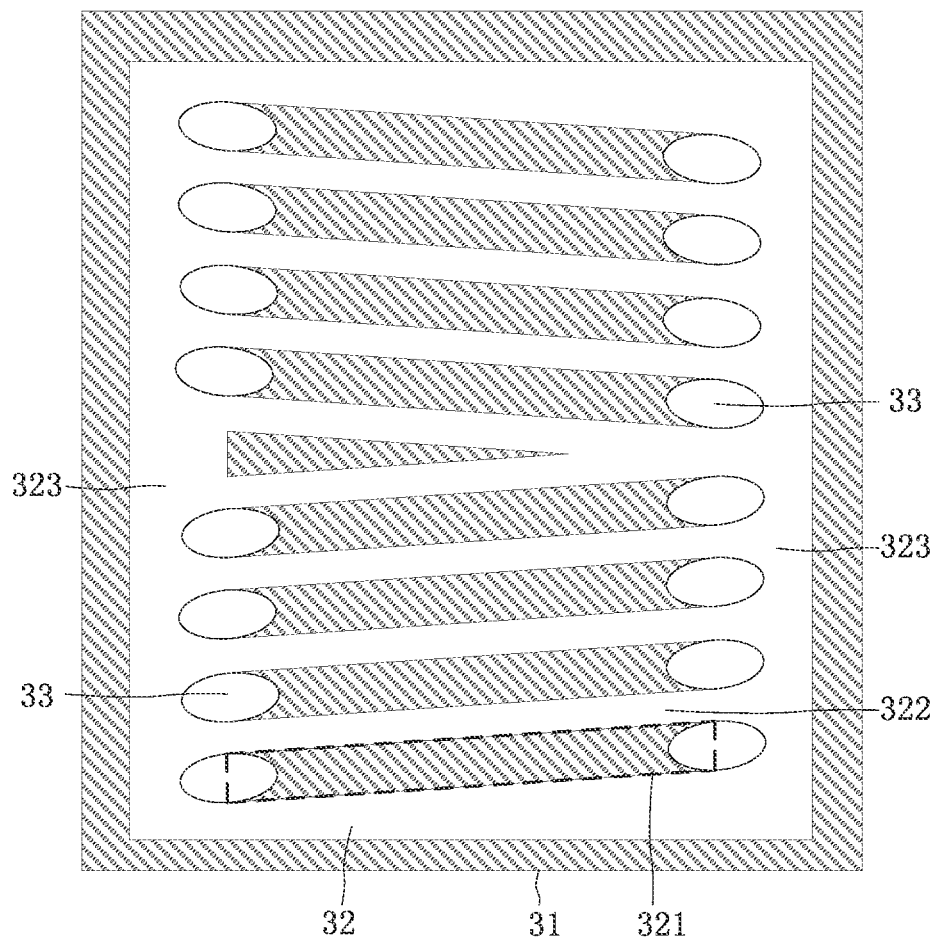
FIG. 9C is a schematic diagram showing a structure of yet another pixel structure according to embodiments of the disclosure.

As shown in FIG. 7A and FIG. 9A, in the case that the both of the end electrode 323 and the first electrode 31 are provided with the concave structures 33, the concave structure 33 of the end electrode 323 has a polygonal shape. Alternatively, as shown in FIG. 9B and FIG. 9C, the concave structure of the end electrode 323 may have an arcuate or arc shape. Of course, the concave structure of the end electrode 323 can also have other shapes, which are not limited herein.

In the case that both of the end electrode 323 and the first electrode 31 are provided with the concave structures 33 or only the first electrode 31 is provided with the concave structure 33, the directions of the electric field between the first electrode 31 and the end electrode 323 become relatively diversified at the intersection between the first electrode 31 and the end electrode 323, due to the shape of the concave structure 33, so as to weaken the electric field unbeneficial for the pixels to display the white state, thereby improving the light transmittance of the pixels during displaying the white state in the FFS display mode.

It is noted that, the dual-domain structure of the pixel structure is described as an example in the embodiments of the above-mentioned pixel structure. In addition, the pixel structure may be implemented in a single-domain structure or other multi-domain structure, the technical solutions in the disclosure are also applicable to these pixel structures, and these pixel structures belong to the protection scope of the disclosure as well.

Additionally, it is noted that, the above-mentioned pixel structure can be applied to an FFS display mode.

Figure 10:
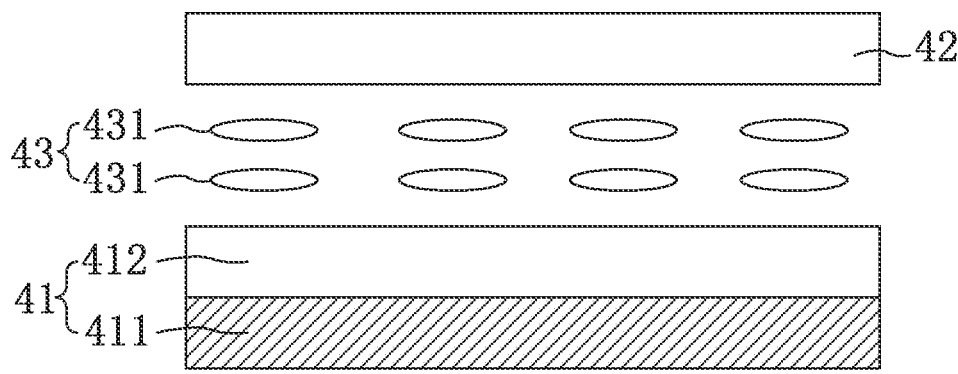
FIG. 10 is a schematic diagram showing a structure of a display panel according to embodiments of the disclosure.

Embodiments of the disclosure provide a display panel. FIG. 10 is a schematic diagram of a structure of a display panel according to embodiments of the disclosure. As shown in FIG. 10, the display panel includes an array substrate 41, a color filter substrate 42 arranged opposite to the array substrate 41, and a liquid crystal layer 43 located between the array substrate 41 and the color filter substrate 42, where the liquid crystal layer 43 includes liquid crystal molecules 431, the array substrate 41 includes a base 411 and a pixel structure 412 arranged on the base 411, and the base 411 is generally a glass substrate. The pixel structure 412 is the pixel structure in the above-mentioned embodiments. The display panel is an FFS liquid crystal display panel.

The pixel structure in the above-mentioned embodiments is applied in the display panel, in embodiments of the disclosure, where at least one of the end electrode and the first electrode is provided with the concave structure in the region or area at the intersection between the end electrode and the first electrode in the pixel structure, and the distance between the end electrode and the first electrode is increased by the concave structure, so that the influence of the electric field, which is formed between the end electrode and the first electrode and is unbeneficial for the pixels displaying the white state, on the rotation of the liquid crystal molecules 431 is reduced, and correspondingly, the light transmittance of the liquid crystal molecules 431 at the intersection between the end electrode and the first electrode is increased, thereby improving the light transmittance of the pixels during displaying the white state in the FFS display mode, such that the display effect of the display panel is optimized.

It is noted that, the above-mentioned display panel may or may not have a touch control function, depending on specific demands during actual manufacturing. The touch control function can be an electromagnetic touch control function, a capacitive touch control function or an electromagnetic-capacitive touch control function, etc.

Figure 11:
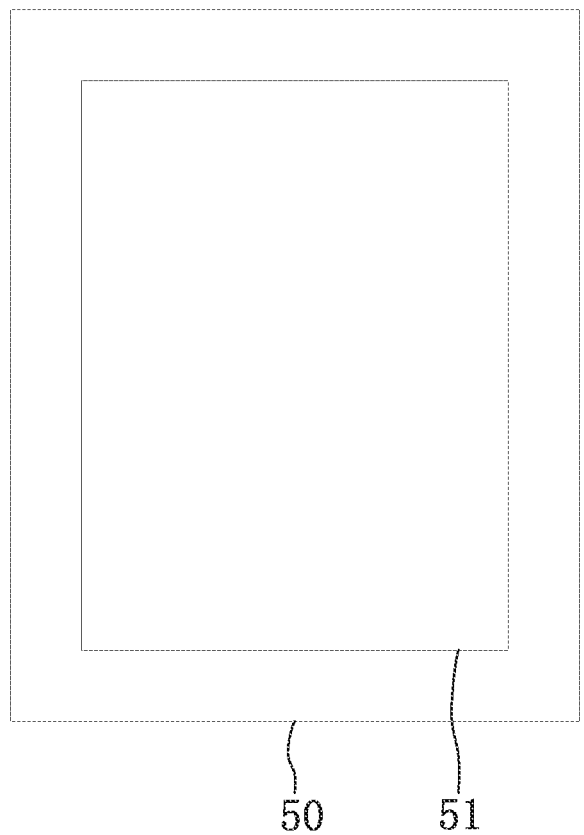
FIG. 11 is a schematic diagram showing a structure of a display device according to embodiments of the disclosure.

Embodiments of the disclosure further provide a display device. FIG. 11 is a schematic diagram of a structure of a display device according to embodiments of the disclosure. As shown in FIG. 11, the display device 50 includes a display panel 51, and may further include a drive circuit and other components used for supporting the normal work of the display device 50, where the display panel 51 is the display panel in the above-mentioned embodiments. The above-mentioned display device 50 may be a mobile phone, a desktop computer, a laptop computer, a tablet computer, an electronic photo album, electronic paper, etc.

With the pixel structure, the display panel and the display device according to embodiments of the disclosure, at least one of the first electrode and the end electrode is provided with the concave structure in the region or area at the intersection between the first electrode and the end electrode of the second electrode in the pixel structure, and distance between the first electrode and the end electrode at the intersection is increased, resulting in that the undesired electric field formed between the end electrode and the first electrode is weakened, namely, the electric field unbeneficial for the pixels to display the white state is weakened, thereby improving the light transmittance of the pixels during displaying the white state in the FFS display mode, such that the display effect of the display panel and the display device is optimized.

It should be noted that, the foregoing descriptions are example embodiments and adopted technical principles of the disclosure. Those skilled in the art will appreciate that the disclosure is not limited to the embodiments described herein, and those skilled in the art can make various obvious variations, readjustments and substitutions without departing from the protection scope of the disclosure. Thus, although the disclosure has been described in detail through the above embodiments, the disclosure is not limited to the above embodiments, and can further include more other equivalent embodiments without departing from the conception of the disclosure, and the scope of the disclosure is determined by the scope of the appended claims.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A pixel structure, comprising:
a first electrode and a second electrode located above the first electrode, wherein the second electrode comprises at least one slit, branch electrodes disposed parallel to the slit, and an end electrode connected with an end of each of the branch electrodes;
wherein at least one of the end electrode and the first electrode is provided with a concave structure in a region at an intersection between the end electrode and the first electrode so as to increase a distance between the end electrode and the first electrode, and the concave structure opens to face an edge of the slit which is adjacent an edge of the end electrode.

2. The pixel structure of claim 1, wherein the first electrode comprises a pixel electrode, and the second electrode comprises a common electrode.

3. The pixel structure of claim 2, wherein an edge of the end electrode at a side thereof close to the branch electrode is adjacent or overlapped with an edge of the first electrode at the intersection between the branch electrode and the end electrode connected with branch electrode.

4. The pixel structure of claim 2, wherein an edge of the end electrode is spaced from an edge of the first electrode by a first preset distance such that the end electrode is not adjacent or overlapped with the first electrode at the intersection between the branch electrode and the end electrode connected with the branch electrode, and the edge is at a side thereof close to the branch electrode.

5. The pixel structure of claim 4, wherein the first preset distance is larger than 0 µm and is less than or equal to 3 µm.

6. The pixel structure of claim 3, wherein the first electrode is provided with a concave structure at the intersection between the end electrode and the first electrode, and the maximum depth of the concave structure is larger than 0 µm and is less than or equal to 6 µm.

7. The pixel structure of claim 4, wherein the first electrode is provided with a concave structure at the intersection between the end electrode and the first electrode, and the maximum depth of the concave structure is larger than 0 µm and is less than or equal to 6 µm.

8. The pixel structure of claim 3, wherein the end electrode is provided with a concave structure at the intersection between the end electrode and the first electrode, and the maximum depth of the concave structure is larger than 0 µm and is less than or equal to 6 µm.

9. The pixel structure of claim 4, wherein the end electrode is provided with a concave structure at the intersection between the end electrode and the first electrode, and the maximum depth of the concave structure is larger than 0 µm and is less than or equal to 6 µm.

10. The pixel structure of claim 3, wherein both of the end electrode and the first electrode are provided with concave structures at the intersection between the end electrode and the first electrode, and the maximum depths of the concave structure at the end electrode and the concave structure at the first electrode are larger than 0 µm and are less than or equal to 6 µm.

11. The pixel structure of claim 4, wherein both of the end electrode and the first electrode are provided with concave structures at the intersection between the end electrode and the first electrode, and the maximum depths of the concave structure at the end electrode and the concave structure at the first electrode are larger than 0 µm and are less than or equal to 6 µm.

12. The pixel structure of claim 6, wherein the first electrode is provided with the concave structure, and an edge of the concave structure is intersected with an edge of the branch electrode adjacent to the concave structure and close to one side of the concave structure.

13. The pixel structure of claim 8, wherein the concave structure has an arc or polygonal shape.

14. The pixel structure of claim 1, wherein the first electrode is a common electrode, and the second electrode is a pixel electrode.

15. The pixel structure of claim 14, wherein the first electrode is provided with the concave structure at the intersection between the end electrode and the first electrode; or both of the end electrode and the first electrode are provided with the concave structures at the intersection between the end electrode and the first electrode.

16. The pixel structure of claim 15, the maximum depth of the concave structure at the first electrode is larger than 0 µm and is less than or equal to 6 µm.

17. The pixel structure of claim 16, the maximum depth of the concave structure at the end electrode is larger than 0 µm and is less than or equal to 6 µm.

18. The pixel structure of claim 15 wherein both of the end electrode and the first electrode are provided with the concave structures, and the concave structure at the end electrode has an arc or polygonal shape.

19. A display panel, comprising a pixel structure, which comprises: a first electrode and a second electrode located above the first electrode, wherein the second electrode comprises at least one slit, branch electrodes disposed parallel to the slit, and an end electrode connected with an end of each of the branch electrodes; wherein at least one of the end electrode and the first electrode is provided with a concave structure at an intersection between the end electrode and the first electrode so as to increase a distance between the end electrode and the first electrode, and the concave structure opens to face an edge of the slit which is adjacent an edge of the end electrode.

20. A display device, comprising a display panel which comprises a pixel structure, and the pixel structure comprises: a first electrode and a second electrode located above the first electrode, wherein the second electrode comprises at least one slit, branch electrodes disposed parallel to the slit, and an end electrode connected with an end of each of the branch electrodes; wherein at least one of the end electrode and the first electrode is provided with a concave structure at an intersection between the end electrode and the first electrode so as to increase a distance between the end electrode and the first electrode, and the concave structure opens to face an edge of the slit which is adjacent an edge of the end electrode.

* * * * *